United States Patent
Yaebashi

[11] Patent Number: 4,468,595
[45] Date of Patent: Aug. 28, 1984

[54] DRIVING CIRCUIT FOR A HALL MOTOR

[75] Inventor: Toshio Yaebashi, Yokohama, Japan

[73] Assignee: Victor Company of Japan, Ltd., Yokohama, Japan

[21] Appl. No.: 450,773

[22] Filed: Dec. 17, 1982

[30] Foreign Application Priority Data

Dec. 28, 1981 [JP] Japan ................................ 56-210391

[51] Int. Cl.³ ............................................ H02K 29/02
[52] U.S. Cl. .................................... 318/254; 318/138; 318/439
[58] Field of Search .................... 318/138, 254, 254 A; 318/439

[56] References Cited

U.S. PATENT DOCUMENTS

| | | | |
|---|---|---|---|
| 3,942,083 | 3/1976 | Takahashi et al. | 318/138 |
| 4,023,082 | 5/1977 | Tanikoshi | 318/138 |
| 4,114,073 | 9/1978 | Uzuka | 318/138 |

Primary Examiner—G. Z. Rubinson
Assistant Examiner—Bentsu Ro
Attorney, Agent, or Firm—Ladas & Parry

[57] ABSTRACT

A driving circuit for a Hall motor comprises a threshold voltage applying circuit for applying a predetermined threshold voltage, a comparing circuit for comparing an output voltage of the Hall element which varies according to the rotation of a rotor of the Hall motor with the threshold voltage, a voltage applying circuit for periodically applying a high input voltage of a pulse-form to a Hall element of the Hall motor, with a period according to an output of the comparing circuit, and a coil driving circuit supplied with the output of the comparing circuit, for producing an activating current to coils of the Hall motor. The period with which the high input voltage of the pulse-form is applied to the Hall element is equal to a period with which a specific magnetic pole position of the rotor opposes the Hall element.

4 Claims, 3 Drawing Figures

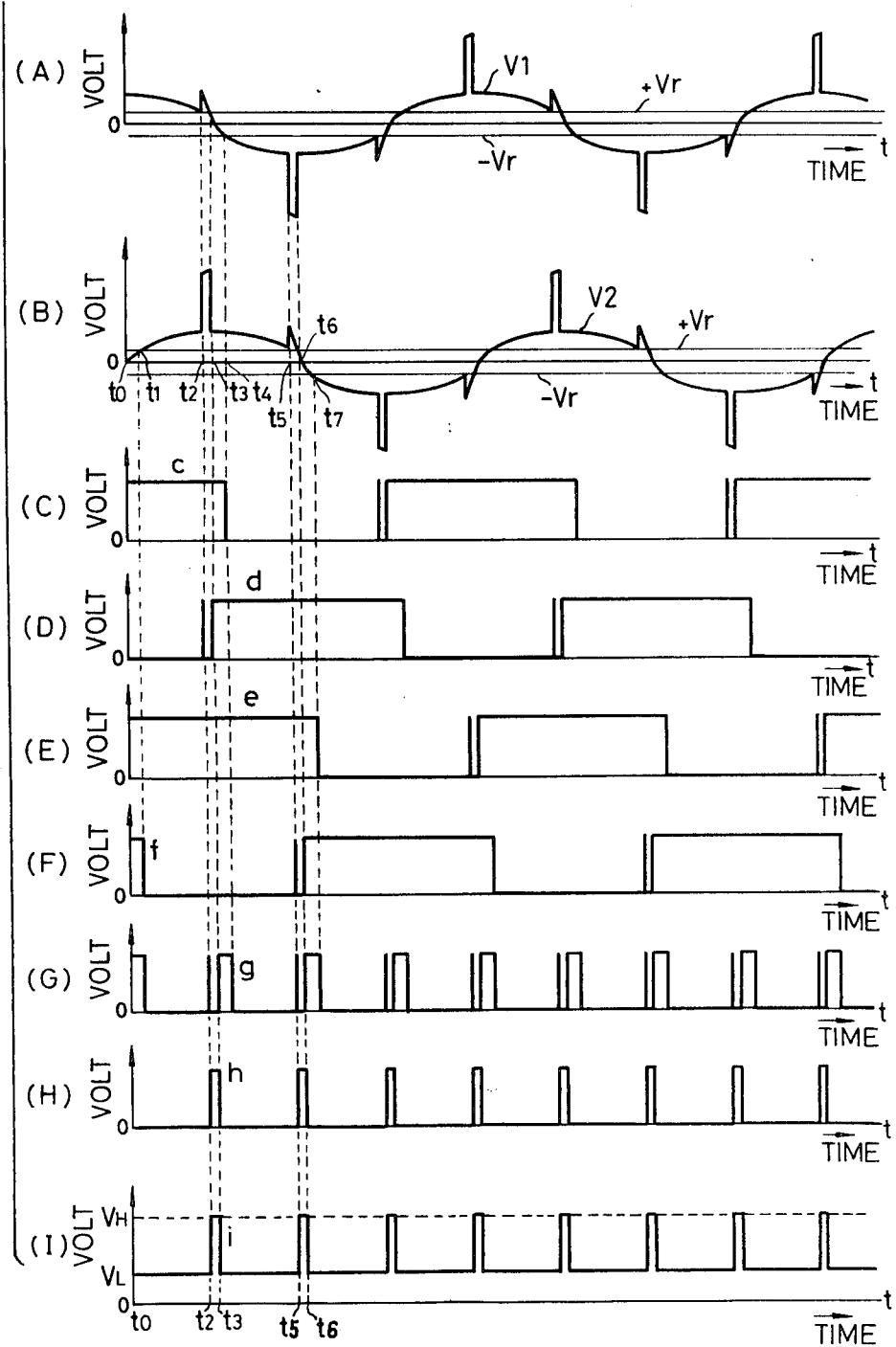

DRIVING CIRCUIT FOR A HALL MOTOR

BACKGROUND OF THE INVENTION

The present invention generally relates to driving circuits for Hall motors using Hall elements, and more particularly to a driving circuit for a Hall motor, which is capable of detecting a rotational position of a rotor of the Hall motor with high accuracy and driving the Hall motor with low power consumption.

Conventionally, as one example of a driving circuit for a Hall motor, there was a driving circuit simply designed to constantly apply or supply a constant voltage or current to Hall elements of the Hall motor. However, this conventional driving circuit is disadvantageous in that the power consumption is high because a constant voltage or current is constantly applied or supplied to the Hall elements.

On the other hand, as another example of a conventional driving circuit for a Hall motor, there was a driving circuit designed to apply or supply a pulse voltage or current having a constant period to the Hall elements of the Hall motor, regardless of the rotational period of the rotor. However, according to this conventional driving circuit, although the power consumption is lower than that of the first conventional driving circuit described above, the period of repetition with which the rotor position is detected by the Hall elements and the period of repetition with which the pulse voltage is applied does not always coincide. Accordingly, there is a disadvantage in that the sensitivity of the Hall elements is low and the accuracy with which the rotor position is detected is poor. Especially when the period of repetition of the pulse voltage is made large so as to reduce the power consumption, the accuracy with which the rotor position is detected becomes even poorer. On the other hand, if the sensitivity of the Hall elements is increased and the period of repetition of the pulse voltage is made small so as to improve the accuracy with which the rotor position is detected, the power consumption becomes high, and the low power consumption characteristic is lost.

SUMMARY OF THE INVENTION

Accordingly, it is a general object of the present invention to provide a novel and useful driving circuit for a Hall motor, in which the above described disadvantages have been eliminated.

Another and more specific object of the present invention is to provide a driving circuit for a Hall motor designed to compare output voltages of Hall elements with threshold voltages, switch input voltages or currents of the Hall elements to larger voltages or currents with a period of repetition of the output voltages of the Hall elements according to compared results, and apply and supply a large voltage or current to the Hall elements when a predetermined position of a rotor magnetic pole opposes the Hall elements. According to the driving circuit of the present invention, the power consumption is low, and the rotor position can be detected with high accuracy.

Other objects and further features of the present invention will be apparent from the following detailed description when read in conjunction with the accompanying drawings.

BRIEF DESCRIPTION OF THE DRAWINGS

FIG. 3 is a graph showing signal waveforms at each part of the circuit shown in FIG. 2.

DETAILED DESCRIPTION

Figure 1:
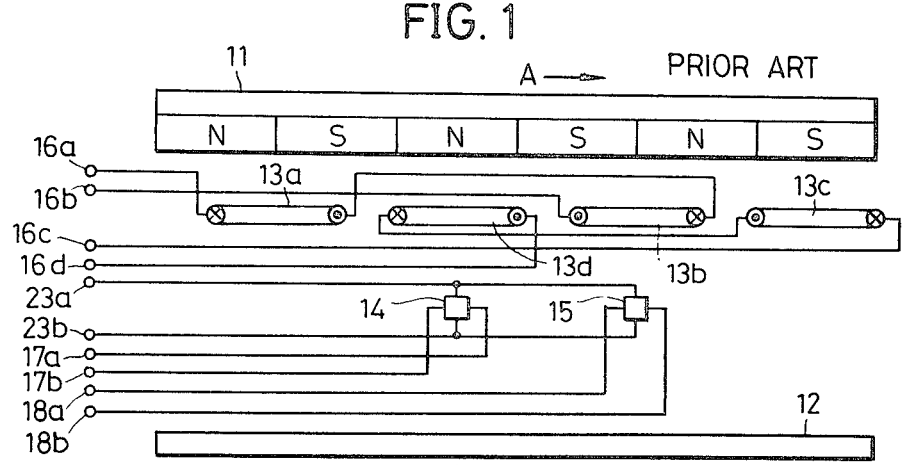
FIG. 1 is a development showing a general Hall motor in principle.
Figure 2:
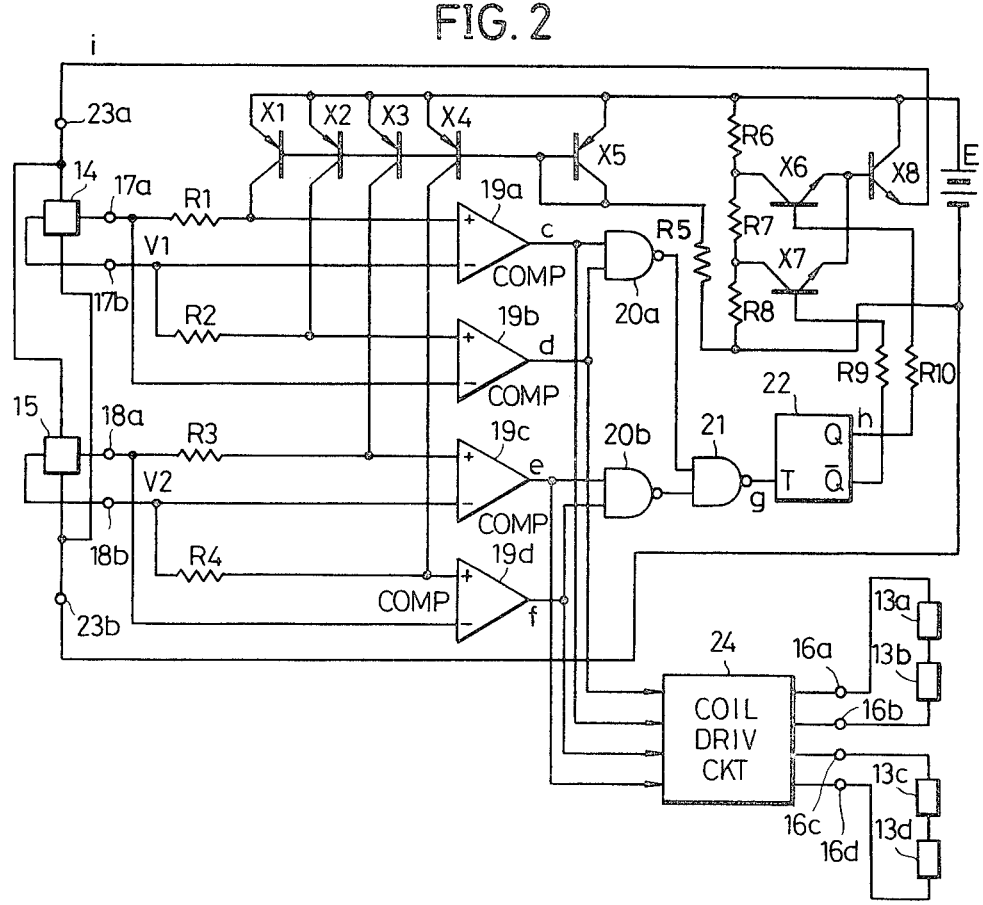
FIG. 2 is a circuit diagram showing an embodiment of a driving circuit for a Hall motor according to the present invention.

FIG. 1 is a development showing a general 6-pole 2-phase Hall motor in principle, to which the driving circuit according to the present invention can be applied. Stator coils 13a through 13d and Hall elements 14 and 15 arranged mutually separated from each other by an electrical angle of 90°, are respectively provided between a stator yoke 12 and a rotor magnet (hereinafter simple referred to as a rotor) 11 of the 6-pole magnet. In FIG. 1, a symbol "x" within a circle indicates a current flowing in a direction towards the paper, and a black circular symbol within a circle indicates a current flowing away from the paper. When voltages from a coil driving circuit 24 shown in FIG. 2 are applied between terminals 16a and 16b and terminals 16c and 16d so that currents flow through the coils 13a through 13d in directions indicated by the symbols, the rotor 11 rotates in the direction of an arrow A. Hence, an output voltage V1 is obtained between output electrode terminals 17a and 17b of the Hall element 14, and an output voltage V2 is obtained between output terminals 18a and 18b of the Hall motor 15, with a phase difference of 90° in electrical angle.

When a power source is turned ON at a time $t_o$ and a Q-output h of a trigger type (T-type) flip-flop 22 shown in FIG. 2 assumes low level as shown in FIG. 3(H), a transistor X6 having its base connected to the Q-output terminal of the flip-flop 22 through a resistor R10 is turned OFF. Resistors R6, R7, and R8 are connected in series between positive and negative terminals of a D.C. voltage source E, and the collector of the transistor X6 is connected to a connection point between the resistors R6 and R7. At this point in time, a transistor X7 having its base connected to a $\overline{Q}$-output terminal of the flip-flop 22 through a resistor R9 and its collector connected to a connection point between the resistors R7 and R8, is turned ON because the $\overline{Q}$-output of the flip-flop 22 assumes high level. Accordingly, a transistor X8 having its base connected to the emitters of the transistors X6 and X7 and its collector connected to the power source E, is turned ON. Input electrode terminals 23a and 23b of the Hall elements 14 and 15 are respectively connected to the emitter of the transistor X8 and the negative terminal of the power source E.

If a base-emitter forward voltage of the transistor X8 is designated by $V_{BE}$, an input voltage (a voltage between the input electrode terminals 23a and 23b) $V_L$ to the Hall elements 14 and 15 can be described by the following equation (1).

$$V_L = \frac{E \cdot R8}{R6 + R7 + R8} - V_{BE} \quad (1)$$

The input voltage $V_L$ is shown in FIG. 3(I). The output voltages V1 and V2 of the Hall elements at this point in time, can be determined by the following equations if magnetic fields applied to the Hall elements 14 and 15 are designated by $H \cos \omega t$ and $H \sin \omega t$, an input resistance of the Hall elements 14 and 15 is designated by $R_{in}$, and a Hall constant of the Hall elements 14 and 15 is designated by k.

$$V1 = k \cdot V_L \cdot H \cos \omega t / R_{in}$$

$$V2 = k \cdot V_L \cdot H \sin \omega t / R_{in}$$

When $$t \approx 0,$$

$$V1 \approx k \cdot V_L \cdot H / R_{in}$$

$$V2 \approx 0$$

In addition, the frequency of the angular velocity ω is three times the rotational frequency of the rotor.

One output electrode terminal 17a of the Hall element 14 is connected to a non-inverting input terminal of a comparator 19a comprising an operational amplifier through a resistor R1, and directly connected to an inverting input terminal of a comparator 19b. The other output electrode terminal 17b is directly connected to an inverting input terminal of the comparator 19a, and connected to a non-inverting input terminal of the comparator 19b through a resistor R2. Similarly, one output terminal 18a of the Hall element 15 is connected to a non-inverting input terminal of a comparator 19c through a resistor R3, and directly connected to an inverting input terminal of a comparator 19d. The other output pole terminal 18b is directly connected to an inverting input terminal of the comparator 19c, and connected to a non-inverting input terminal of the comparator 19d through a resistor R4.

Transistors X1 through X5 constitute a current mirror circuit, and emitters of these transistors are connected to the positive side of the power source E and bases of these transistors are connected to the negative side of the power source E through a resistor R5. Collectors of the transistors X1 through X4 are respectively connected to connection points between the resistors R1 through R4 and the non-inverting input terminals of the comparators 19a through 19d. Input resistances of the comparators 19a through 19d are extremely high, and may be considered to be infinity. Hence, a constant current I described by the following equation flows through the resistors R1 through R4 from the current mirror circuit.

$$I = \frac{E - V_{be}}{R5}$$

In the above equation, $V_{be}$ represents a base-emitter voltage in a state where the transistors X1 through X5 are ON. If resistances of the resistors R1 through R4 are set such that $R1 = R2 = R3 = R4 = R_o$, a terminal voltage $V_r$ of each of the resistors R1 through R4 can be described by the following equation (2).

$$V_r = \frac{R_o(E - V_{be})}{R5} \quad (2)$$

The voltage $V_r$ described by the above equation (2) and the output voltage V1 of the Hall element 14 are compared at the comparators 19a and 19b, while the voltage $V_r$ and the output voltage V2 of the Hall element 15 are compared at the comparators 19c and 19d. Accordingly, The voltage $V_r$ acts as a threshold voltage of each of the comparators.

The relationship between the output voltages V1 and V2 of the Hall elements and the voltage $V_r$ becomes as follows, and the voltage $V_r$ is set to a small value as may be seen from the following relationship.

$$k \cdot V_L \cdot H / R_{in} > V_r > 0$$

At a time immediately after the time $t_o$, $V1 > V_r$ and $V2 < V_r$, and outputs c and d of the comparators 19a and 19b assume high level and low level, respectively, as shown in FIGS. 3(C) and 3(D). On the other hand, outputs e and f of the comparators 19c and 19d both assume high level, as shown in FIGS. 3(E) and 3(F). The outputs of the comparators 19a and 19b are supplied to a NAND-gate 20a, and a high-level output of the NAND-gate 20a is applied to a NAND-gate 21. The outputs of the comparators 19c and 19d are supplied to a NAND-gate 20b, and a low-level output of the NAND-gate 20b is applied to the NAND-gate 21. Accordingly, an output g of the NAND-gate 21 assumes high level as shown in FIG. 3(G), and is applied to a T-input (trigger-input) terminal of the flip-flop 22. The outputs of the comparators 19a through 19d are supplied to the coil driving circuit 24, and produced as coil driving signals.

When the rotor 11 of the Hall motor starts to rotate, the output voltage V1 of the Hall element 14 as shown in FIG. 3(A), and the output voltage V2 of the Hall element 15 rises as shown in FIG. 3(B). When the voltage V2 becomes equal to the voltage $V_r$ at a time t1, the output f of the comparator 19d assumes low level and the output of the NAND-gate 20b assumes high level. Because the voltage V1 is still larger than the voltage $V_r$ at this point in time, the output of the NAND-gate 20a remains at high level. Accordingly, the output g of the NAND-gate 21 assumes low level at the time t1. However, since the output state of the flip-flop 22 is varied according to the rise in its input voltage, the output h of the flip-flop 22 does not change and remains at low level. Hence, the Hall input voltage between the terminals 23a and 23b remains at the voltage $V_L$ as shown in FIG. 3(I).

As the motor further continues to rotate and the voltage V1 falls to become equal to the voltage $V_r$ at a time t2, the outputs c, e, and f of the comparators 19a, 19c, and 19d remain at high level, high level, and low level, respectively, but the output d of the comparator 19b instantaneously assumed high level from the low level at the time t2. Accordingly, the output of the NAND-gate 20a assumes low level while the output of the NAND-gate 20b remains at high level, and the output g of the NAND-gate 21 assumes high level. The Q-output h of the flip-flop 22 assumes high level as shown in FIG. 3(H), because of this rise in the output g. As a result, the transistors X6 and X8 are turned ON, and the transistor X7 is turned OFF. If the Hall input voltage at this point in time is designated by $V_H$, the voltage $V_H$ can be described by the following equation (3).

$$V_H = \frac{E(R7 + R8)}{R6 + R7 + R8} - V_{BE} \quad (3)$$

The Hall output voltages V1 and V2 at this point in time are as follows.

$$V1 = k \cdot V_H \cdot H \cos \omega t / R_{in}$$

$$V2 = k \cdot V_H \cdot H \sin \omega t / R_{in}$$

As clearly seen from the equations (1) and (3), $V_H > V_L$, and the high voltage $V_H$ is applied to the Hall elements 14 and 15 at the time t2.

Because the Hall input voltage instantaneously becomes the high voltage $V_H$ as described above, the output voltage V1 of the Hall element 14 instantaneously assumes a large value at the time t2 as shown in FIG. 3(A). Thus, the output d of the comparator 19b is immediately returned to low level. The output voltage V2 of the Hall element 15 also becomes large at the time t2, but there is no change in the outputs of the comparators 19c and 19d, and there accordingly is no change in the output of the NAND-gate 20b. The output g of the NAND-gate 21 again assumes low level because the output of the comparator 19d assumes low level, however, the Q-output h of the flip-flop 22 is not inverted and remains at high level.

As the motor further continues to rotate, the output voltage V1 of the Hall element 14 falls and becomes equal to the voltage $V_r$ at a time t3. At this point in time, the outputs c, e, and f of the comparators 19a, 19c, and 19d do not change, but the output d of the comparator 19b assumes high level. Accordingly, the output g of the NAND-gate 21 assumes high level to trigger the flip-flop 22, and the output h of the flip-flop 22 is inverted to assume low level. Thus, the transistor X6 is turned OFF while the transistors X7 and X8 are turned ON, and the Hall input voltage i again assumes the low voltage $V_L$. In addition, the output voltage V2 of the Hall element 15 returns to its normal voltage.

Beyond the time t3, the output voltage V1 of the Hall element 14 continues to fall. When the output voltage V1 becomes equal to $-V_r$, the outputs d, e, and f of the comparators 19b, 19c, and 19d do not change, but the output c of the comparator 19a assumes low level. Hence, the output g of the NAND-gate 21 assumes low level, but the flip-flop 22 is not triggered, and the Q-output h of the flip-flop 22 remains at low level.

The output voltage V2 of the Hall element 15 continues to fall beyond the time t3, and the output voltage V2 becomes equal to the voltage $V_r$ at a time t5. At this point in time, the output f of the comparator 19d assumes high level. As a result, the output g of the NAND-gate 21 assumes high level, and the Q-output h of the flip-flop 22 assumes high level. Hence, the high voltage $V_H$ is applied to the Hall elements 14 and 15, and the output voltage V2 instantaneously assumes a large voltage. At this point in time, the output f of the comparator 19d again assumes low level, and the output g of the NAND-gate 21 accordingly assumes low level. When the output voltage V2 falls and again becomes equal to the voltage $V_r$ at a time t6, the output f of the comparator 19d again assumes high level, and the output g of the NAND-gate thus also assumes high level. Therefore, the output h of the flip-flop 22 assumes low level, and the Hall input voltage becomes equal to the voltage $V_L$. Furthermore, when the output voltage V2 becomes equal to the voltage $-V_r$ at a time t7, the output e of the comparator 19c assumes low level, and the output g of the NAND-gate 21 assumes low level.

Similarly thereafter, the above described operations are repeated every time the output voltages V1 and V2 of the Hall elements 14 and 15 becomes lower than the voltage $V_r$ and every time the output voltage V1 and V2 becomes higher than the voltage $-V_r$. Thus, the high voltage $V_H$ is applied to the Hall elements 14 and 15 in a pulse form as shown in FIG. 3(I). In the present embodiment of the invention, twelve pulse-form voltage $V_H$ shown in FIG. 3(I) correspond to one revolution of the rotor, since the 6-pole rotor and two Hall elements are employed. However, in FIGS. 3(A) through 3(I), it should be noted that the signal waveforms are only shown for eight pulse-form voltage $V_H$ corresponding to ⅔ revolution of the rotor, due to the limited space available in the drawing.

The pulse-form voltage $V_H$ assumes a high level at every 90° electrical angle of the output voltages V1 and V2 of the Hall elements, that is for the duration in which a specific position of any rotor magnetic pole passes directly above the Hall element 14 or 15. Thus, according to the circuit of the present invention, the Hall elements 14 and 15 are supplied with the high voltage $V_H$ only upon detection of the rotor position to improve the detection sensitivity of the Hall elements, and the Hall input voltages are set to the low voltage $V_L$ during other periods. Therefore, the accuracy with which the rotational position is detected is high, and the power consumption becomes small.

At the times t2, t5, . . . , there is a high-level part of an extremely narrow pulse form in one of the outputs of the comparators 19a through 19d, but this narrow pulse is eliminated at the driving circuit 24. For example, a circuit within the driving circuit 24 for eliminating the above narrow pulse comprises a delay circuit having a delay time which is slightly larger than the duration of the narrow pulse, and an AND-gate for carrying out an AND operation with respect to the output of the comparator which is passed through the above delay circuit and the output of the comparator which is not passed through the delay circuit. The output of the AND-gate is already eliminated of the narrow pulse. By providing such a delay circuit, the rise in the output part of the comparator continuing to assume high level is slightly delayed, but there is no effect upon actual driving of the motor. The circuit construction of the driving circuit 24 per se is well known and a detailed description is therefore omitted.

In some cases, the Q-output h of the flip-flop 22 may assume high level when the power source is turned ON at the time $t_o$. In such a case, the Q-output h of the flip-flop 22 remains at high level, until the output voltage V1 of the Hall element 14 becomes equal to the voltage $V_r$. When the output voltage V1 becomes equal to the voltage $V_r$, the output d of the comparator 19b assumes high level, and the output g of the NAND-gate 21 also assumes high level. Accordingly, the Q-output h of the flip-flop 22 assumes low level at this point in time. For this reason, the output voltage V1 of the Hall element 14 continues to fall, because the high voltage is not applied to the Hall elements 14 and 15. However, when the output voltage V2 of the Hall element 15 becomes equal to the voltage $V_r$, the operation beyond that point becomes identical to those described before. In such a case where the Q-output h of the flip-flop 22 assumes high level when the power source is turned ON, the Hall input voltage remains at the high voltage $V_H$ from the time when the motor starts to rotate until the output voltage V1 becomes equal to the voltage $V_r$. Therefore, the first detection of the position after the power source is turned ON, can be carried out with high accuracy.

In addition, two Hall elements are employed in the above described embodiment, but only one Hall element may be employed instead.

Further, the present invention is not limited to these embodiments, but various variations and modifications may be made without departing from the scope of the present invention.

What is claimed is:

1. A driving circuit for a Hall motor which comprises a Hall element, a rotor having magnetic poles for subjecting said Hall element to a magnetic field, and coils for rotating said rotor, said driving circuit comprising:
   a threshold voltage applying circuit for applying a predetermined threshold voltage;
   a comparing circuit for comparing an output voltage of said Hall element which varies according to the rotation of said rotor with said threshold voltage;
   a voltage applying circuit for periodically applying a high input voltage of a pulse-form to said Hall element, for a duration according to an output of said comparing circuit; and
   a coil driving circuit supplied with the output of said comparing circuit, for producing an activating current to said coils, said duration in which the high input voltage of the pulse-form is applied to said Hall element corresponding to a duration in which a specific position of any one of the magnetic poles opposes said Hall element.

2. A driving circuit as claimed in claim 1 in which threshold voltage applying circuit comprises resistors of predetermined resistances connected between an output side of said Hall element and an input side of said comparing circuit, and a current mirror circuit for supplying a constant current to each of said resistors.

3. A driving circuit as claimed in claim 1 in which said voltage applying circuit comprises a flip-flop inverted of its output according to the output of said comparing circuit, and a transistor circuit switched ON and OFF according to an output of said flip-flop, for switching the voltage applied to said Hall element between a low voltage and said high input voltage of the pulse-form.

4. A driving circuit as claimed in claim 1 in which two Hall elements are provided as said Hall element so as to introduce output voltages having phases shifted by 90° in electrical angle, said comparing circuit comprising four comparators of which two comparators are respectively connected to each of said Hall elements, output levels of said comparators changing to high level or low level when the output voltages of said two Hall elements fall or rise respectively to become equal to said threshold voltage $V_r$ or $-V_r$.

* * * * *